United States Patent
Uozumi et al.

(10) Patent No.: US 7,374,001 B2
(45) Date of Patent: May 20, 2008

(54) FUEL CELL AUTOMOBILE

(75) Inventors: Tetsuo Uozumi, Miura-gun (JP);
Takeshi Shiomi, Yokohama (JP);
Hisashi Nakata, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 296 days.

(21) Appl. No.: 11/146,063

(22) Filed: Jun. 7, 2005

(65) Prior Publication Data
US 2006/0024542 A1    Feb. 2, 2006

(30) Foreign Application Priority Data
Jul. 29, 2004    (JP)    ............... 2004-221711

(51) Int. Cl.
*H01M 8/04* (2006.01)
(52) U.S. Cl. ............... 180/65.3; 180/68.4; 429/12
(58) Field of Classification Search ............... 180/65.1, 180/65.3, 68.4; 429/12, 26, 34
See application file for complete search history.

(56) References Cited

U.S. PATENT DOCUMENTS

| 5,537,956 A | * | 7/1996 | Rennfeld et al. | ........ 123/41.29 |
| 5,641,031 A | * | 6/1997 | Riemer et al. | ............. 180/65.3 |
| 6,378,637 B1 | * | 4/2002 | Ono et al. | ................... 180/65.3 |
| 6,448,535 B1 | * | 9/2002 | Ap | ............................. 219/208 |
| 6,905,792 B2 | * | 6/2005 | Imaseki et al. | ............... 429/20 |
| 6,978,855 B2 | * | 12/2005 | Kubota et al. | ............. 180/65.3 |
| 7,191,858 B2 | * | 3/2007 | Vanderwees et al. | ...... 180/65.3 |
| 7,255,945 B2 | * | 8/2007 | Enjoji et al. | .................. 429/13 |
| 2003/0062204 A1 | | 4/2003 | Kato et al. | |

FOREIGN PATENT DOCUMENTS

JP    2003-182379 A    7/2003

\* cited by examiner

*Primary Examiner*—Christopher Ellis
*Assistant Examiner*—Brian Swenson
(74) *Attorney, Agent, or Firm*—Global IP Counselors, LLP

(57) ABSTRACT

A fuel cell automobile basically comprises a fuel cell, a cooling system, and a coolant pipe unit. The fuel cell is disposed under a floor panel of a vehicle. The cooling system is configured and arranged to regulate temperature of the fuel cell using a coolant. The cooling system includes at least one cooling system component part that is disposed in a front portion of the vehicle. The coolant pipe unit extends between the fuel cell and the cooling system component part. The coolant pipe unit has a generally horizontal portion disposed in a space under the floor panel and a slope portion extending and sloping continuously upwardly from the horizontal portion to the cooling system component part above the floor panel.

18 Claims, 8 Drawing Sheets

FUEL CELL AUTOMOBILE

CROSS-REFERENCE TO RELATED APPLICATIONS

This application claims priority to Japanese Patent Application No. 2004-221711. The entire disclosure of Japanese Patent Application No. 2004-221711 is hereby incorporated herein by reference.

BACKGROUND OF THE INVENTION

1. Field of the Invention

The present invention relates to a fuel cell automobile having a fuel cell mounted, for example, below a floor panel of the vehicle. More particularly, the present invention relates to a layout technology for the fuel cell automobile for efficiently arranging the parts that cool the fuel cell and the parts that deliver the fuel to the fuel cell in a space under the floor panel of the fuel cell automobile.

2. Background Information

In a fuel cell system, heat is generated when the fuel cell (fuel cell stack) generates electricity. In order to dissipate the generated heat, the fuel cell is typically cooled using a coolant together with a radiator or other heat exchanger.

When the fuel cell is mounted under the floor or floor panel of the vehicle, it is necessary to circulate the coolant between the fuel cell located under the floor and the radiator located in a front portion of the vehicle.

Meanwhile, in order to secure as much space as possible inside the cabin or vehicle interior, it is desirable to keep the height of the floor panel as low as possible. It is not an easy task to secure sufficient mounting space and a suitable layout under the floor for parts related to the coolant piping and parts for delivering other fluids (e.g., hydrogen, oxygen, and other fuels and oxidizing agents) used for the fuel cell while also keeping the floor height low.

It is also necessary to minimize the accumulation of air inside the piping that can occur when coolant is added (poured into) to the radiator. The accumulation of air inside the piping can also occur during operation of the vehicle. The accumulation of air inside the piping, too, makes it difficult to both secure sufficient space in the cabin and achieve a suitable layout for the piping and related parts for the fuel cell.

As a solution to these issues, Japanese Laid-Open Patent Publication No. 2003-182379 discloses a fuel-cell-equipped electric automobile having a fuel cell mounted under a floor of a vehicle. In such fuel-cell-equipped electric automobile, a fuel cell system box is provided under the floor of the vehicle and the fuel cell, temperature regulating equipment, humidifying equipment, etc., are housed inside the fuel cell system box. The purpose of the fuel cell system box is to ensure sufficient space in the vehicle interior including both the cabin and the luggage compartment.

In view of the above, it will be apparent to those skilled in the art from this disclosure that there exists a need for an improved fuel cell automobile that can secure sufficient space in the cabin and achieve a suitable layout for the piping and related parts for the fuel cell. This invention addresses this need in the art as well as other needs, which will become apparent to those skilled in the art from this disclosure.

SUMMARY OF THE INVENTION

In the fuel-cell-equipped electric automobile described in the above mentioned reference, the entire space under the floor has a certain degree of height due to the existence of the fuel cell system box and the entire floor surface inside the cabin is higher than in the case of a convention vehicle that is driven with an internal combustion engine. As a result, the space inside the cabin of the fuel-cell-equipped electric automobile is limited and sufficient living space and luggage space cannot be secured.

Accordingly, one object of the present invention is to ensure that sufficient space is provided inside the vehicle interior, improve the effectiveness with which air is removed from the coolant, and reduce the space occupied by piping and parts related to the fuel cell in a fuel cell automobile.

In order to achieve the above object and other objects of the present invention, a fuel cell automobile is provided that basically comprises a fuel cell, a cooling system, and a coolant pipe unit. The fuel cell is disposed under a floor panel of a vehicle. The cooling system is configured and arranged to regulate temperature of the fuel cell using a coolant. The cooling system includes at least one cooling system component part that is disposed in a front portion of the vehicle. The coolant pipe unit extends between the fuel cell and the cooling system component part. The coolant pipe unit has a generally horizontal portion disposed in a space under the floor panel and a slope portion extending and sloping continuously upwardly from the horizontal portion to the cooling system component part above the floor panel.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
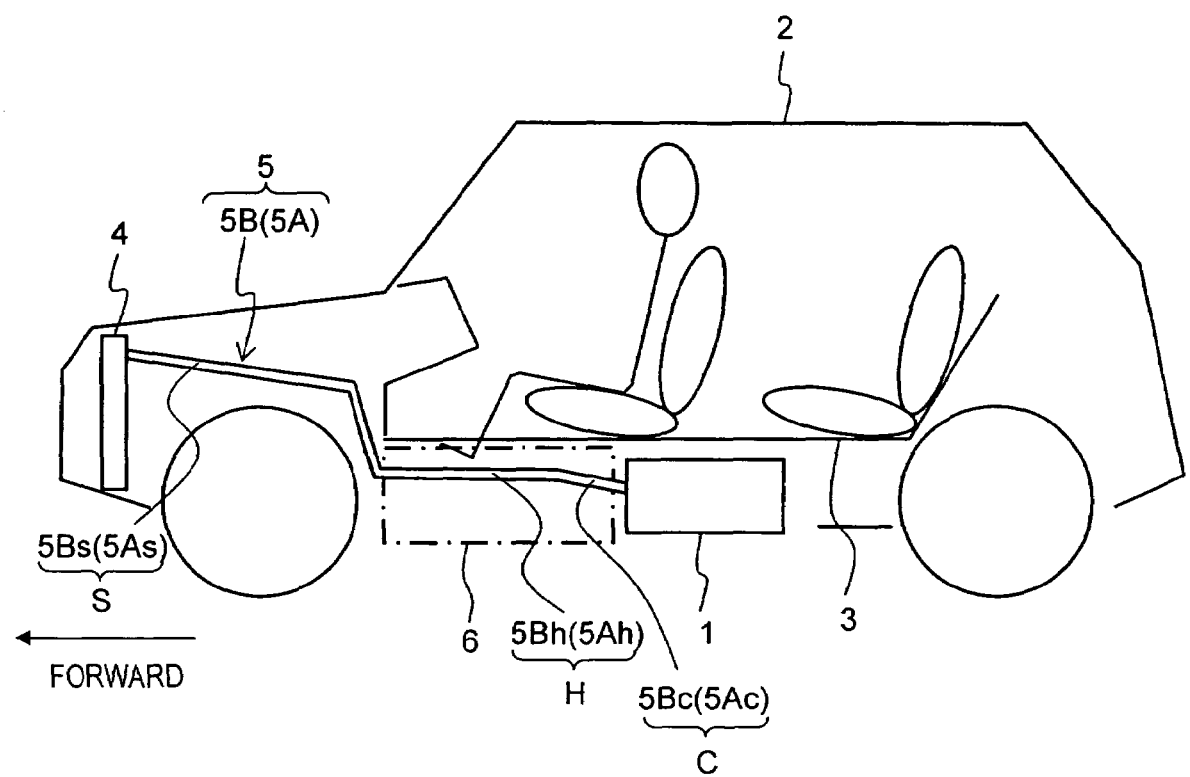
FIG. 1 is an overall diagrammatic side view of a fuel cell automobile illustrating height relationships between a fuel cell and a cooling system component part in a fuel cell automobile in accordance with a first embodiment of the present invention.
Figure 2:
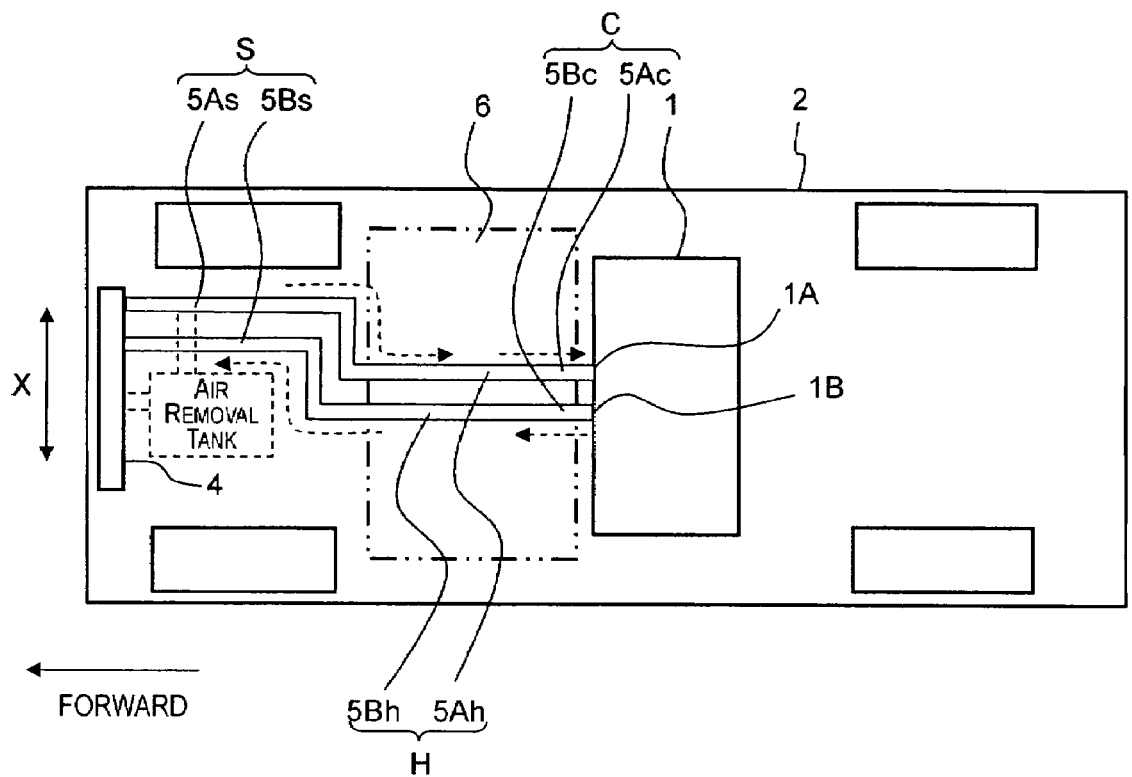
FIG. 2 is a simplified top plan view of a below-floor panel layout of the fuel cell and the cooling system component part in the fuel cell automobile illustrated in FIG. 1 in accordance with the first embodiment of the present invention.
Figure 3:
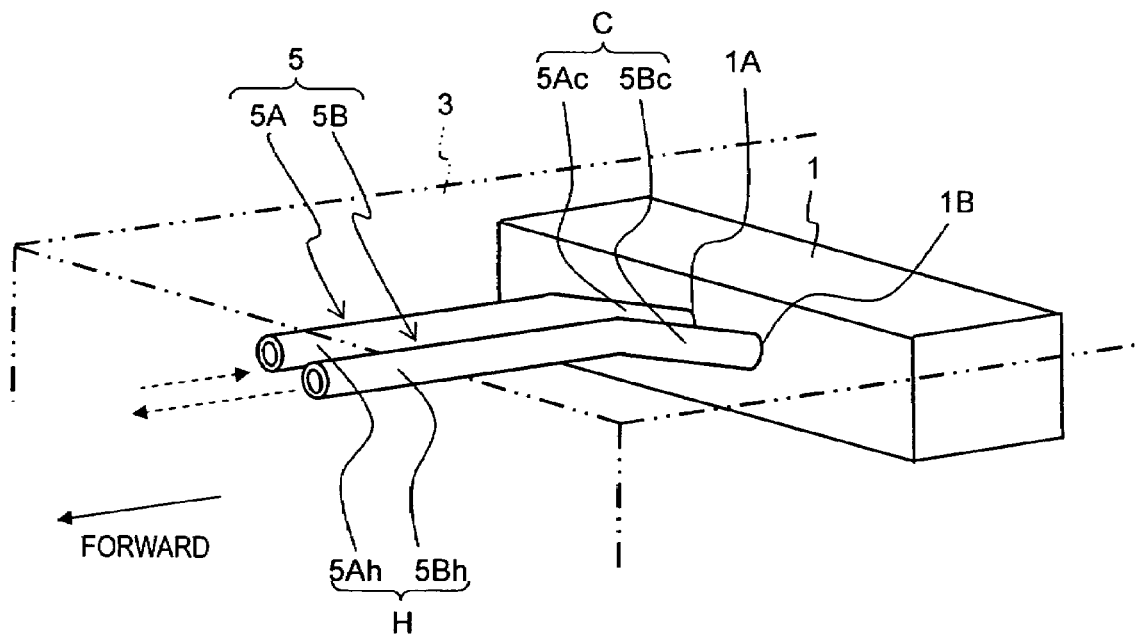
FIG. 3 is an enlarged simplified front perspective view of the fuel cell and a coolant pipe unit disposed in a space below the floor panel showing positions where the coolant pipe unit is connected to the fuel cell in the fuel cell automobile illustrated in FIGS. 1 and 2 in accordance with the first embodiment of the present invention.

Referring initially to FIG. 1, a fuel cell automobile or vehicle 2 is illustrated in accordance with a first embodiment of the present invention. FIG. 1 is a diagrammatic view of the fuel cell automobile or vehicle 2 illustrating height relationships between a fuel cell 1, a cooling system component part (a radiator 4 in the first embodiment) and a coolant pipe unit 5 in accordance with the first embodiment of the present invention. FIG. 2 is a simplified top plan view of the below-floor panel layout of the fuel cell 1 and the radiator 4 in the vehicle 2 illustrated in FIG. 1 with an optional air removal tank shown in broken lines. FIG. 3 is an enlarged simplified perspective view of a space below a floor panel 3 of the vehicle 2 showing positions where the coolant pipe unit 5 including a pair of coolant pipes 5A and 5B is connected to the fuel cell 1.

As shown in FIGS. 1 to 3, the fuel cell automobile in accordance with the first embodiment includes the fuel cell 1 (fuel cell stack) that is the main component part of the fuel cell system, a motor (not shown) that is driven by the electrical energy generated by the fuel cell 1, and a cooling system that is configured and arranged to dissipate the heat generated by the fuel cell 1 when the fuel cell 1 generates electricity and to regulate the temperature of the fuel cell 1. In the first embodiment, the cooling system includes at least the radiator 4.

As seen in FIG. 1, in the fuel cell automobile of the first embodiment, the fuel cell 1 is mounted (disposed) under the floor panel 3, i.e., under the floor of the vehicle 2, and the radiator 4 is disposed in the front portion (the engine compartment or motor room) of the vehicle 2. As mentioned above, the radiator 4 constitutes one component part of the cooling system (i.e., cooling system component part) for regulating the temperature of the fuel cell 1 with a coolant. Moreover, as seen in FIGS. 1 and 2, a below-floor fuel cell system area 6 (shown in a rectangular space enclosed by a double dot chain line in FIGS. 1 and 2) is provided so that such air-related parts as an air humidifier and an air pressure regulating valve and such hydrogen related parts as a hydrogen circulating device and a hydrogen pressure regulating valve are arranged within the below-floor fuel cell system area 6. These air-related parts and the hydrogen related parts for the fuel cell 1 are conventional components that are well known in the art. Since the air-related parts and the hydrogen related parts for the fuel cell 1 are well known in the art, these structures will not be discussed or illustrated in detail herein. Rather, it will be apparent to those skilled in the art from this disclosure that the components can be any type of structure as long as that can be disposed in the below-floor fuel cell system area 6 and that can be used to carry out the present invention.

In the fuel cell automobile of the first embodiment, the coolant pipe unit 5 including the coolant pipes 5A and 5B extend between the fuel cell 1 and the radiator 4 disposed in the front portion of the vehicle 2. As best seen in FIG. 2, the coolant pipes 5A and 5B extend in a substantially longitudinal direction of the vehicle 2, and the coolant pipes 5A and 5B are preferably arranged substantially parallel to each other in a transverse direction of the vehicle 2 (i.e., in the direction indicated with the arrows X in FIG. 2). As seen in FIG. 1, the coolant pipe unit 5 includes a horizontal portion H that is arranged in the approximate center portion of the space under the floor panel 3 relative to the transverse direction of the vehicle 2 and a slope portion S that is disposed above of the floor panel 3. Moreover, in the first embodiment of the present invention, the coolant pipe unit 5 includes a connecting portion C that extends between the horizontal portion H and the fuel cell 1 as seen in FIG. 1.

More specifically, the horizontal portion H of the coolant pipe unit 5 is formed with horizontal sections 5Ah and 5Bh of the coolant pipes 5A and 5B, respectively, that are located in the space under the floor panel 3, and that extend substantially horizontal. The slope portion S of the coolant pipe unit 5 is formed with slope portions 5As and 5Bs of the coolant pipes 5A and 5B that are located inside the engine compartment (or the motor room) and slope upwardly toward the radiator 4 as seen in FIG. 1. Thus, the coolant flows from the radiator 4 to the fuel cell 1 through the slope section 5As and the horizontal section 5Ah of the coolant pipe 5A and returns to the radiator 4 through the horizontal section 5Bh and the slope section 5Bs of the coolant pipe 5B after cooling the fuel cell 1. The direction of flow of the coolant in the coolant pipes 5A and 5B are shown by dotted line arrows in FIG. 2.

As mentioned above, the coolant pipe unit S in the first embodiment includes the connecting portion C that comprises connecting sections SAc and SBc of the coolant pipes 5A and 5B. The fuel cell 1 includes a coolant inlet 1A and a coolant outlet 1B that are connected to the connecting sections 5Ac and 5Bc of the coolant pipes 5A and 5B, respectively. In the first embodiment of the present invention, the coolant inlet 1A and the coolant outlet 1B are disposed in the fuel cell 1 on an upper, approximate middle portion of the frontward side of the fuel cell 1 at vertical positions that are lower than the vertical positions of the horizontal sections 5Ah and 5Ab the coolant pipes 5A and 5B as shown in FIG. 3. Therefore, the connecting sections 5Ac and 5Bc of the coolant pipes 5A and 5B are slanted upwardly toward the forward side of the vehicle 2 to extend between the horizontal sections 5Ah and 5Bh of the coolant pipes 5A and 5B and the coolant inlet and outlet 1A and 1B of the fuel cell 1 as seen in FIG. 3. Since the horizontal sections 5Ah and 5Bh of the coolant pipes 5A and 5B are arranged in a relatively high position relative to the coolant inlet and outlet 1A and 1B of the fuel cell 1, air can be prevented from accumulating inside the fuel cell 1 better than if the horizontal sections 5Ah and 5Bh of the coolant pipes 5A and 5B were arranged in a lower vertical position. Therefore, it is easier to remove air that accumulates in the coolant pipes 5A and 5B. As a result, it is not necessary to provide separate piping for removing air in the first embodiment of the present invention.

By arranging the coolant pipes 5A and 5B in this manner, the distance over which the coolant pipes 5A and 5B must extend to reach from the fuel cell 1 to the radiator 4 located in the front portion of the vehicle 2 can be shortened and the coolant pipes 5A and 5B can be routed in a horizontal or upward sloping manner, i.e., without any downward slopes with respect to a direction from the fuel cell 1 to the radiator 4. As a result, air can be prevented from accumulating when coolant is added to the cooling system and when air flows into the cooling system during operation. Thus, the cooling performance of the fuel cell automobile can be prevented from declining due to air in the cooling system and the temperature controllability can be improved.

If the coolant pipes 5A and 5B connecting the fuel cell 1 to the radiator 4 had any section that slopes downward, then it would be possible for a flow of air bubbles to develop from the fuel cell 1 toward the radiator 4 and air will readily accumulate in the coolant pipes 5A and 5B disposed below the floor panel 3. Air introduced into the cooling system when coolant is added (poured into) to the radiator 4 and air bubbles that develop during operation of the fuel cell system will accumulate inside the coolant pipes 5A and 5B and cause the cooling performance to decline and the temperature controllability to decline. Furthermore, if accumulated air is drawn into a coolant pump or if air exists inside the coolant pump, the intake coolant flow rate of the coolant pump will decline and the cooling performance and control performance will decline. Moreover, if a detecting part of a temperature sensor used to detect the temperature of the fuel cell 1 is not immersed in the coolant, the temperature controllability of the fuel cell 1 will be degraded.

Additionally, with the first embodiment, since the coolant pipes 5A and 5B are arranged in the approximate transverse center portion of the vehicle 2 and excessive horizontal and vertical zigzagging of the coolant pipes 5A and 5B is avoided as seen in FIG. 2, the length of the coolant pipes 5A and 5B can be held to a minimum and, thus, both the mass of the coolant pipe unit 5 and the space occupied by the coolant pipe unit 5 can be reduced.

Accordingly, with the fuel cell automobile in accordance with the present invention, the coolant pipe unit 5 connecting the fuel cell 1 to the radiator 4 can be arranged to cover a short distance and to extend in a horizontal or upward sloping manner, i.e., without any downward slopes. As a result, air can be prevented from accumulating when coolant is added to the cooling system and when air flows into the cooling system during operation. Thus, the cooling performance can be prevented from declining due to air in the system and the temperature controllability can be improved.

Second Embodiment

Figure 4:
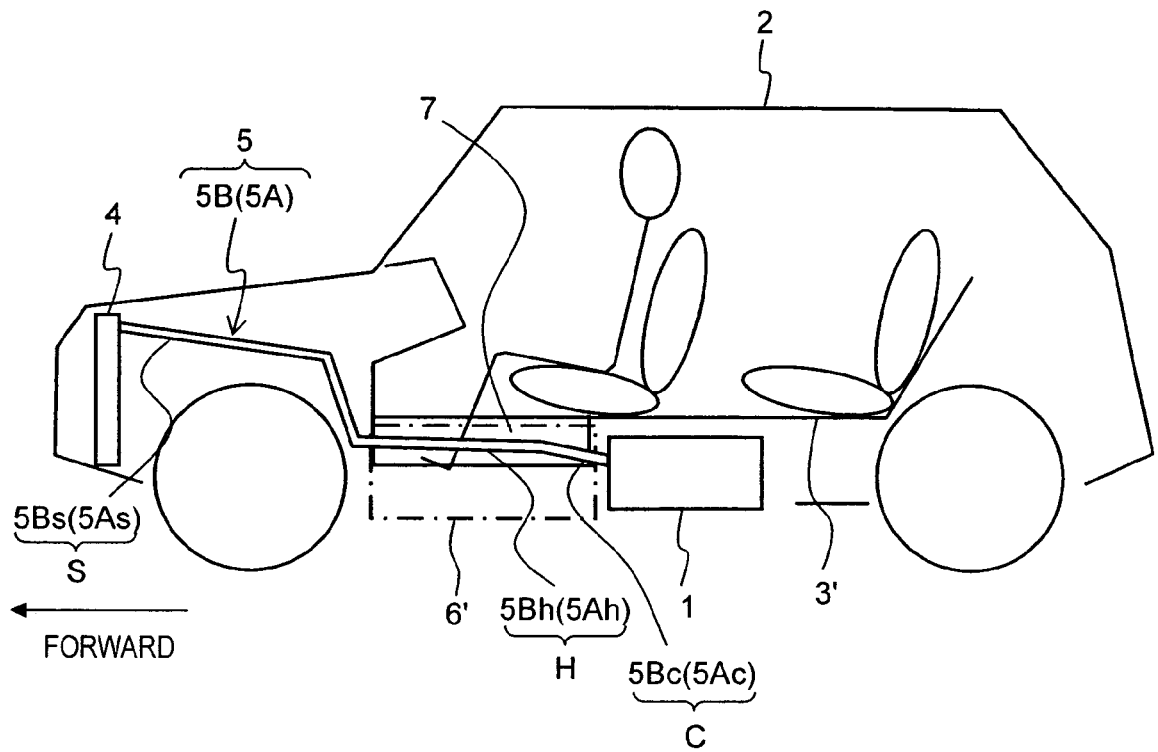
FIG. 4 is an overall diagrammatic side view of a fuel cell automobile illustrating height relationships between a fuel cell and a cooling system component part in a fuel cell automobile in accordance with a second embodiment of the present invention.
Figure 5:
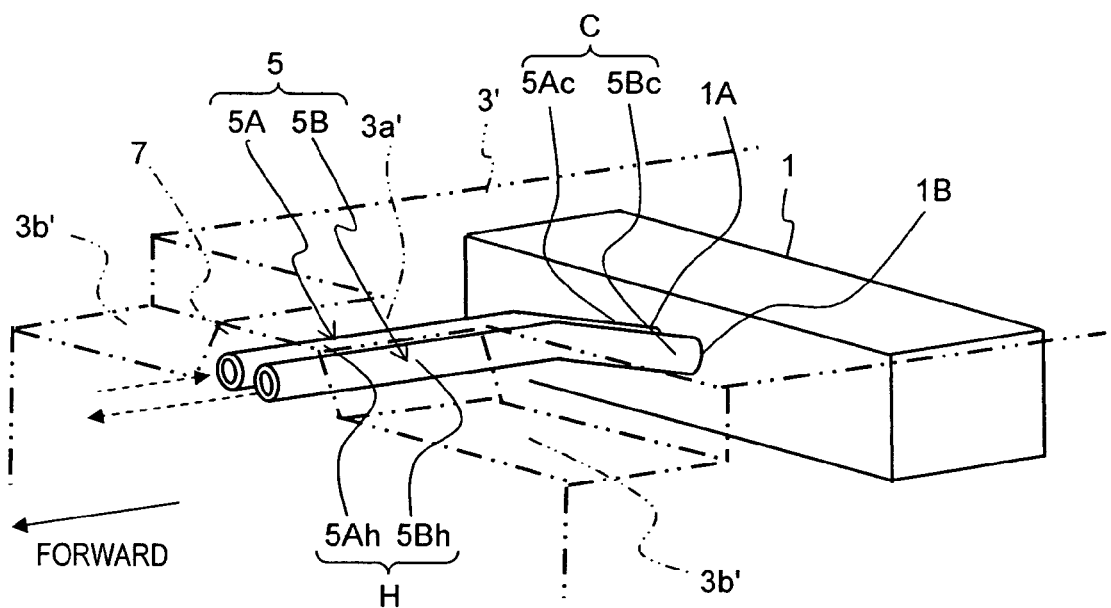
FIG. 5 is an simplified front perspective view of the fuel cell and a coolant pipe unit disposed in a space below a floor panel showing positions where the coolant pipe unit is connected to the fuel cell in the fuel cell automobile illustrated in FIG. 4 in accordance with the second embodiment of the present invention.

Referring now to FIGS. 4 and 5, a fuel cell automobile in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The fuel cell automobile of the second embodiment is basically identical to the fuel cell automobile of the first embodiment except that a floor panel 3' of the second embodiment is provided with a center tunnel portion 7 and the horizontal portion H of the coolant pipe unit 5 is disposed in the center tunnel portion 7 of the floor panel 3'.

FIG. 4 is a diagrammatic side view showing height relationships between the fuel cell 1 and the radiator 4 in the fuel cell automobile in accordance with the second embodiment of the present invention. FIG. 5 is an enlarged simplified perspective view of the space below the floor panel 3' showing positions where the coolant pipes 5A and 5B connect to the fuel cell 1 of the fuel cell automobile illustrated in FIG. 4.

As shown in FIGS. 4 and 5, in addition to the constituent features of the first embodiment, the horizontal portion H of the coolant pipe unit 5 (i.e., the horizontal sections 5Ah and 5Bh of the coolant pipes 5A and 5B) of the second embodiment is disposed inside the center tunnel portion 7 formed by the floor panel 3'. More specifically, the center tunnel portion 7 is formed in a portion of the floor panel 3' that is located in the approximate center front portion of the floor panel 3' and the center tunnel portion 7 bulges upwardly into the vehicle interior. In other words, in the area of the floor panel 3' under which the horizontal portion H of the coolant pipe unit 5 is disposed, the height of a center part 3a' of the floor panel 3' is higher than the heights of the side parts 3b' of the floor panel 3' located on both transverse sides of the center part 3a' as measured from ground level as seen in FIG. 5. Thus, the height differences between the center part 3a' and the side parts 3b' of the floor panel 3' form the center tunnel portion 7 therebetween, and the horizontal portion H of the coolant pipe unit 5 are disposed inside the center tunnel portion 7.

With the fuel cell automobile of the second embodiment, since the horizontal portion H of the coolant pipe unit 5 is arranged in the bulged or raised center tunnel portion 7 of the floor panel 3', the level of the areas of the floor panel 3' other than the center tunnel portion 7 (the side parts 3b' of the floor panel 3') can be lowered. As a result, the living space in the vehicle interior can be enlarged in accordance with the amount by which the level of the floor panel 3' is lowered in the side parts 3b'.

Third Embodiment

Figure 6:
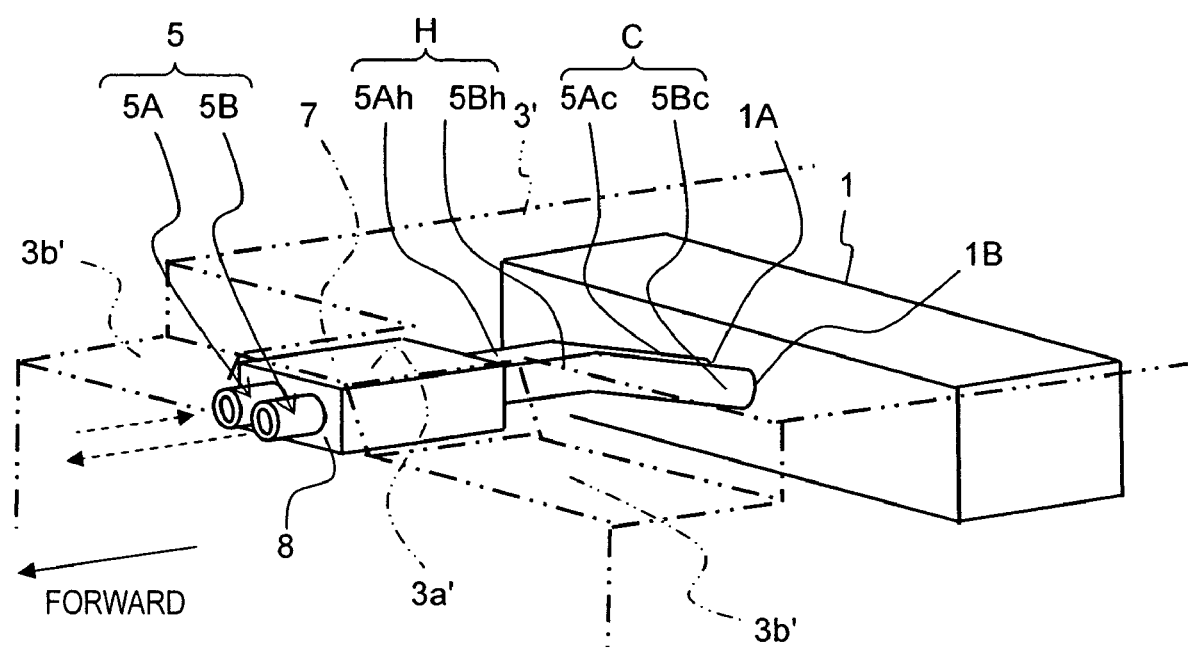
FIG. 6 is an simplified front perspective view of a fuel cell, a coolant pipe unit and a coolant supply module disposed in a space below a floor panel showing positions where the coolant supply module is coupled to the coolant pipe unit that is connected to the fuel cell in a fuel cell automobile in accordance with a third embodiment of the present invention.

Referring now to FIG. 6, a fuel cell automobile in accordance with a third embodiment will now be explained. In view of the similarity between the second and third embodiments, the parts of the third embodiment that are identical to the parts of the second embodiment will be given the same reference numerals as the parts of the second embodiment. Moreover, the descriptions of the parts of the third embodiment that are identical to the parts of the second embodiment may be omitted for the sake of brevity. The parts of the third embodiment that differ from the parts of the first or second embodiment will be indicated with a single prime (')

The fuel cell automobile of the third embodiment is basically identical to the fuel cell automobile of the second embodiment except that a coolant supply module 8 is further provided in the horizontal portion H of the coolant pipe unit 5.

FIG. 6 is an enlarged simplified perspective view of the space below the floor panel 3' showing positional relationships of the connections between the fuel cell 1 and the coolant supply module 8 arranged under the floor panel 3' in the fuel cell automobile in accordance with the third embodiment of the present invention.

As shown in FIG. 6, in addition to the constituent features of the first and second embodiments, the fuel cell automobile of the third embodiment also includes the coolant supply module 8 that preferably comprises conventional components for supplying coolant such as a pump, a filter, a valve, and the like in a concentrated manner inside the center tunnel portion 7. The horizontal sections 5Ah and 5Bh of the coolant pipes 5A and 5B (the horizontal portion H of the coolant pipe unit 5) are also both connected to the coolant supply module 8 in the center tunnel portion 7 as shown in FIG. 6.

With the third embodiment of the present invention, since the coolant supply module 8 are arranged in a concentrated manner inside the center tunnel portion 7, the number and length of the pipes connected between the components of the coolant supply module 8 can be reduced. Even if height differences along the flow path inside the concentrated coolant supply module 8 make it necessary to provide an air removal pipe, the arrangement of the air removal piping from the coolant supply module 8 to the radiator 4 or an air removal tank can be simplified and held to a compact form.

Fourth Embodiment

Figure 7A:
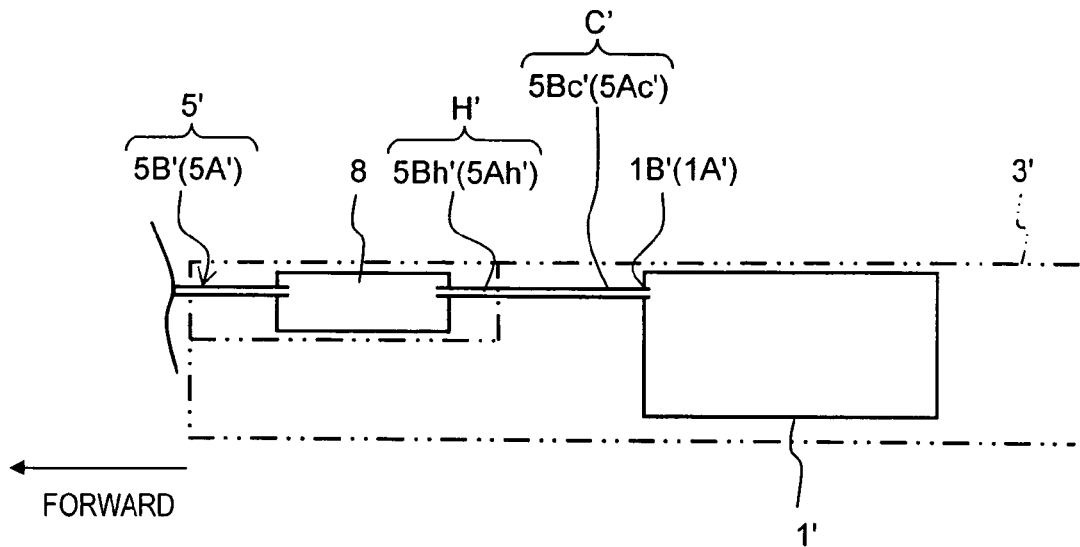
FIG. 7(A) is a diagrammatic side view of a fuel cell, a coolant pipe unit and a coolant supply module disposed in a space below a floor panel showing height relationships of connections between the fuel cell and the coolant pipe unit in a fuel cell automobile in accordance with a fourth embodiment of the present invention.
Figure 7B:
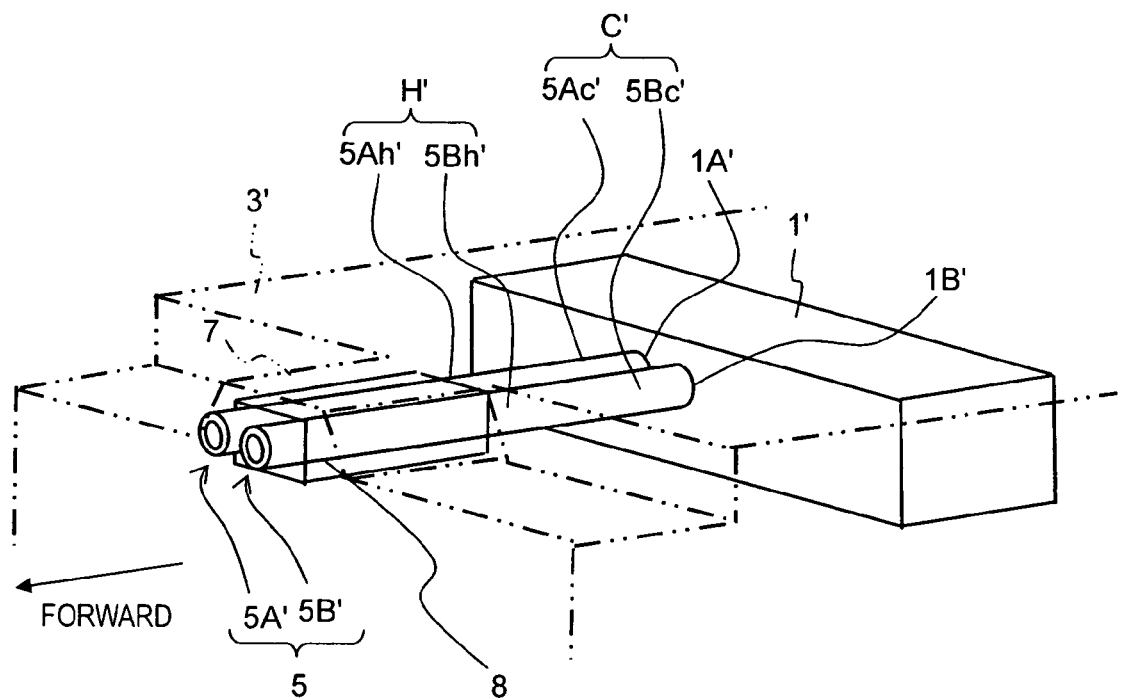
FIG. 7(B) is an simplified front perspective view of the fuel cell, the coolant pipe unit and the coolant supply module disposed in the space below the floor panel showing positions where the coolant pipe unit is coupled to the fuel cell in the fuel cell automobile in accordance with the fourth embodiment of the present invention.

Referring now to FIGS. 7(A) and 7(B), a fuel cell automobile in accordance with a fourth embodiment will now be explained. In view of the similarity between the third and fourth embodiments, the parts of the fourth embodiment that are identical to the parts of the third embodiment will be given the same reference numerals as the parts of the third embodiment. Moreover, the descriptions of the parts of the fourth embodiment that are identical to the parts of the third embodiment may be omitted for the sake of brevity. The parts of the fourth embodiment that differ from the parts of the third embodiment will be indicated with a single prime (').

The fuel cell automobile of the fourth embodiment is basically identical to the fuel cell automobile of the third embodiment except in the fourth embodiment, positions of a coolant inlet 1A' and a coolant outlet 1B' provided in a fuel cell 1' are arranged to be substantially level with a vertical height of a horizontal portion H' of a coolant pipe unit 5' that is formed by horizontal sections 5Ah' and 5Bh' of coolant pipes 5A' and 5B'.

FIG. 7(A) is a diagrammatic side view of a space under the floor panel 3' showing height relationships of the connections between the coolant pipe unit 5' and the fuel cell 1' and the coolant supply module 8 in the fuel cell automobile in accordance with the fourth embodiment of the present invention. FIG. 7(B) is an enlarged simplified perspective view of the space below the floor panel 3' in accordance with the fourth embodiment.

As shown in FIGS. 7(A) and 7(B), in the fourth embodiment, the coolant inlet 1A' and the coolant 1B' provided on the fuel cell 1' are arranged on an upper, approximate middle portion of the frontward side of the fuel cell 1. Moreover, vertical positions of the coolant inlet 1A' and the coolant outlet 1B' are substantially level to the vertical heights of the horizontal portion H' of the coolant pipe unit 5' (i.e., the horizontal sections 5Ah' and 5Bh' of the coolant pipes 5A' and 5B'). Therefore, in the fourth embodiment of the present invention, a connecting portion C' of the coolant pipe unit 5' (i.e., connecting sections 5Ac and 5Bc of the coolant pipes 5A' and 5B') that extend between the horizontal portion H' of the coolant pipe unit 5' and the coolant inlet and outlet 1A' and 1B' is arranged substantially horizontal to form a substantially straight line with the horizontal portion H' as seen in FIGS. 7(A) and 7(B).

With the fourth embodiment, the piping layout under the floor panel 3' can be simplified and both the mass of the coolant pipe unit 5' and the space occupied by the coolant pipe unit 5' can be reduced because the coolant inlet and outlet 1A' and 1B' of the fuel cell 1' can be arranged on an upper portion of the fuel cell 1' in the approximate middle relative to the transverse direction of the vehicle 2, i.e., closer to the horizontal portion H' of the coolant pipe unit 5' (i.e., the horizontal sections 5Ah' and 5Bh' of the coolant pipes 5A' and 5B').

Additionally, with the fourth embodiment, as well as in the previous embodiments, since the coolant pipes 5A' and 5B' are arranged in a relatively high position relative to the fuel cell 1, air can be prevented from accumulating inside the fuel cell 1 better than if the coolant pipes 5A' and 5B' were arranged in a lower position. Therefore, it is easier to remove air that accumulates in the coolant pipes 5A' and 5B'. As a result, it is not necessary to provide separate piping for removing air.

It will be apparent to those skilled in the art from this disclosure that the arrangements of the coolant inlet 1A' and the coolant outlet 1B' with respect to the horizontal portion H' of the coolant pipe unit 5' can be adapted to any of the first to third and fifth to seventh embodiments described herein.

Fifth Embodiment

Figure 8:
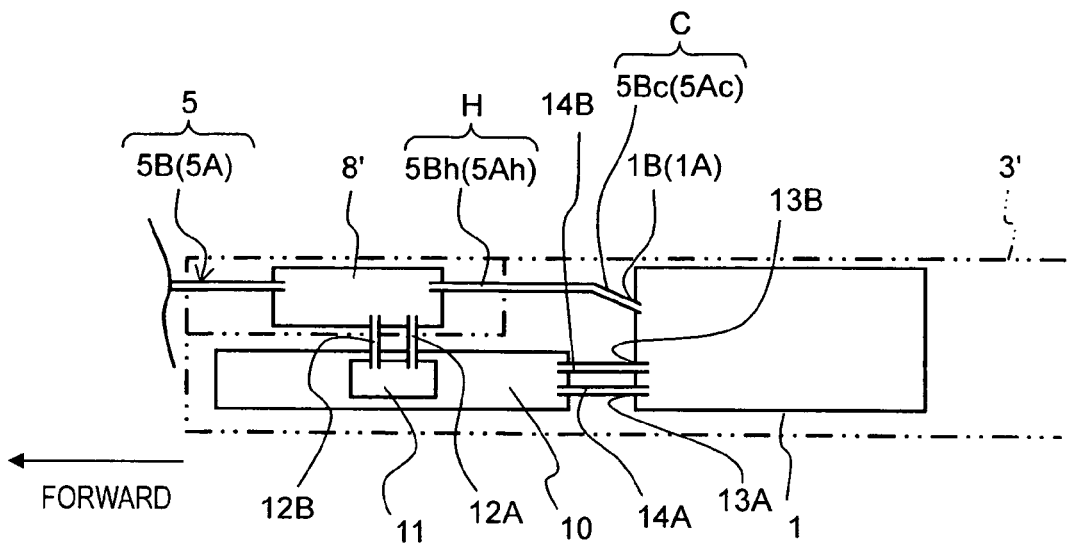
FIG. 8 is a diagrammatic side view of a fuel cell, a coolant pipe unit, a coolant supply module and a fuel supply unit disposed in a space below a floor panel showing height relationships of connections between the coolant supply module and the fuel supply unit in a fuel cell automobile in accordance with a fifth embodiment of the present invention.
Figure 9:
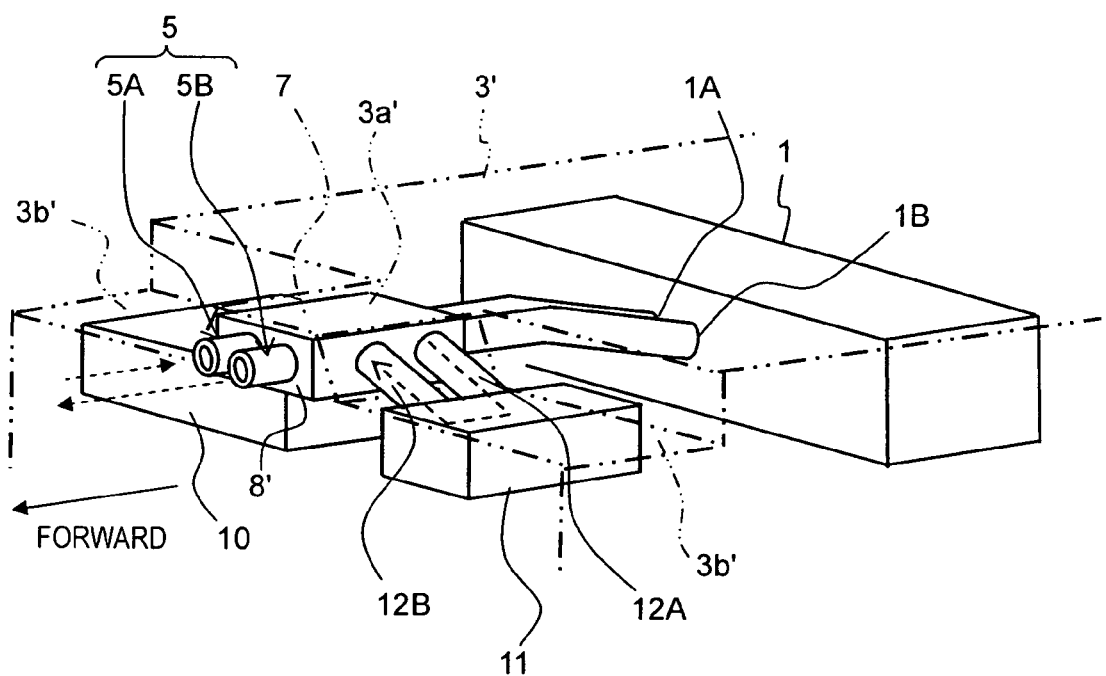
FIG. 9 is an simplified front perspective view of the fuel cell, the coolant pipe unit, the coolant supply module and the fuel supply unit disposed in the space below the floor panel showing positions where the fuel supply unit is connected to the coolant supply module in the fuel cell automobile in accordance with the fifth embodiment of the present invention.

Referring now to FIGS. 8 and 9, a fuel cell automobile in accordance with a fifth embodiment will now be explained. In view of the similarity between the third and fifth embodiments, the parts of the fifth embodiment that are identical to the parts of the third embodiment will be given the same reference numerals as the parts of the third embodiment. Moreover, the descriptions of the parts of the fifth embodiment that are identical to the parts of the third embodiment may be omitted for the sake of brevity. The parts of the fifth embodiment that differ from the parts of the third embodiment will be indicated with a single prime (').

The fuel cell automobile of the fifth embodiment is basically identical to the fuel cell automobile of the third embodiment except that a reaction gas supply module 10 and a heat exchanger 11 are disposed under the floor panel 3' in vertical positions below the coolant supply module 8'. The reaction gas supply module 10 and the heat exchanger 11 preferably comprises the fuel supply unit of the present invention.

FIG. 8 is a diagrammatic side view of a space under the floor panel 3' showing height relationships between the coolant pipe unit 5 and the fuel cell 1, the coolant supply module 8', the reaction gas supply module 10 and the heat exchanger 11 in the fuel cell automobile in accordance with the fifth embodiment of the present invention. FIG. 9 is an enlarged perspective view showing the positional relationships of the connections between the fuel cell 1 and the coolant supply module 8', the reaction gas supply module 10 and the heat exchanger 11 arranged under the floor panel 3' of the fuel cell automobile of FIG. 8.

As shown in FIGS. 8 and 9, in addition to the constituent features of the third embodiment, the fifth embodiment is provided with the reaction gas supply module 10 comprising hydrogen-related parts and oxygen-related parts for supplying hydrogen as fuel and oxygen as an oxidizing agent to the fuel cell 1, and the heat exchanger 11 for raising the temperature of the hydrogen. The reaction gas supply module 10 and the heat exchanger 11 can be arranged at the same height as or lower than the coolant supply module 8'. In the fifth embodiment, the reaction gas supply module 10 and the heat exchanger 11 are arranged in positions lower than the coolant supply module 8' as seen in FIGS. 8 and 9.

The oxygen-related parts in the reaction gas supply module 10 include, for example, an air humidifier for humidifying the air supplied to the fuel cell 1 and an air pressure regulating valve for regulating the pressure of the supplied air. The hydrogen-related parts in the reaction gas supply module 10 include a hydrogen circulating device for circulating the hydrogen and a hydrogen pressure regulating valve for regulating the pressure of the supplied hydrogen. The oxygen-related parts and the hydrogen-related parts of the reaction gas supply module 10 and the heat exchanger 11 are conventional components that are well known in the art. Since the oxygen-related parts and the hydrogen-related parts of the reaction gas supply module 10 and the heat exchanger 111 for the fuel cell 1 are well known in the art, these structures will not be discussed or illustrated in detail herein. Rather, it will be apparent to those skilled in the art from this disclosure that the components can be any type of structure as long as that can be disposed at the same height as or lower than the coolant supply module 8' and that can be used to carry out the present invention. The reaction gas supply module 10 is preferably coupled to a pair of reaction gas inlets 13A (only one shown in FIG. 8) and a pair of reaction gas outlets 13B (only one shown in FIG. 8) with a pair of reaction gas pipes 14A (only one shown in FIG. 8) and a pair of reaction gas pipes 14B (only one shown in FIG. 8). The reaction gas inlets 13A and the reaction gas outlets 13B constitute the fuel inlet and the fuel outlet, respectively, of the present invention.

The structure of the fuel cell automobile of the fifth embodiment is beneficial when, for example, the coolant is used to exchange heat with other fluids in addition to the fuel cell 1 itself, e.g., exchange heat with the fluids in the air-related parts and the hydrogen-related parts in the reaction gas supply module 10. Since the other fluid related parts are arranged at the same height as or lower than the coolant supply module 8', it is easier to remove air from inside the heat exchanger 11 and coolant piping leading to the heat exchanger 11 and it is not necessary to install separate air removal piping. More specifically, a pair of additional coolant pipes 12A and 12B leading to the other fluid related parts (i.e., the heat exchanger 11) slope downward to the heat exchanger 11 and return on an upward slope as seen in FIG. 9. Consequently, neither air that was already in the coolant pipes 12A and/or 12B nor air or air bubbles that are mixed with the coolant will accumulate inside the heat exchanger 11 and, instead, such air and air bubbles can rise back up toward the cooling system (i.e., coolant supply module 8'). As a result, there is no need for separate air removal piping.

Since the reaction gas supply module 10 (the air-related parts, the hydrogen-related parts, etc.) is arranged in the vertically lower position than the coolant supply module 8', the fifth embodiment of the present invention is advantageous with respect to the collection and processing of moisture contained in the exhaust gas discharged from the fuel cell 1. If the reaction gas supply module 10 (the air-related parts, the hydrogen-related parts, etc.) was arranged in a vertically higher position, liquid droplets that developed in the air flow passage and hydrogen flow passage would easily return to the inside of the fuel cell 1. Since it is sometimes preferable to discharge excess water and water droplets resulting from humidification by the air humidifier, an advantageous effect can be obtained by arranging the reaction gas supply module 10 including the air-related parts and hydrogen-related parts in the vertically low position.

Sixth Embodiment

Figure 10:
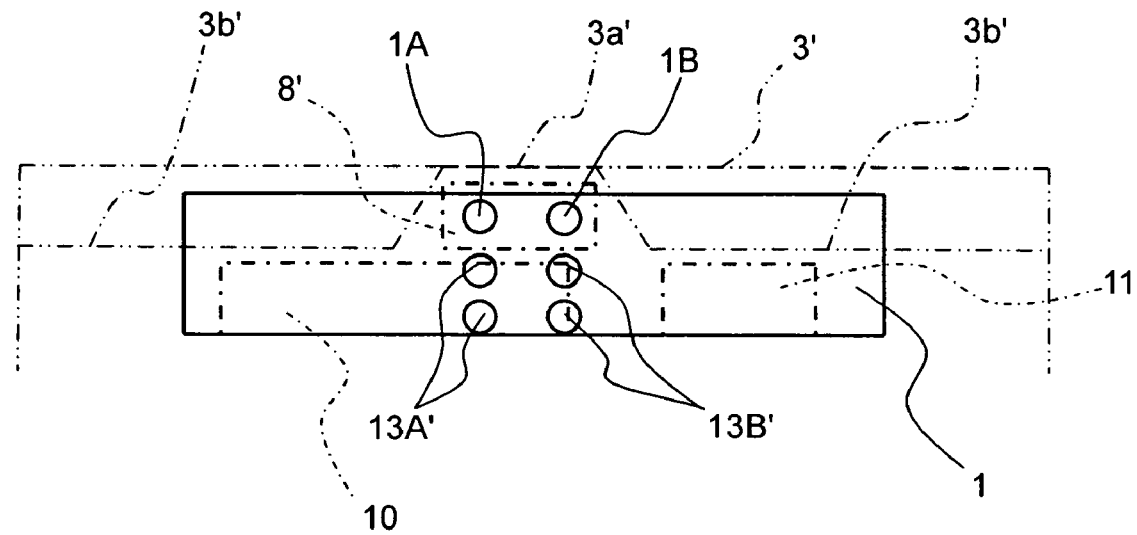
FIG. 10 is a simplified diagrammatic front view of a fuel cell showing height relationships of a pair of coolant inlet and outlet and pairs of fuel inlets and outlets provided in a front side of the fuel cell in a fuel cell automobile in accordance with a sixth embodiment of the present invention.
Figure 11:
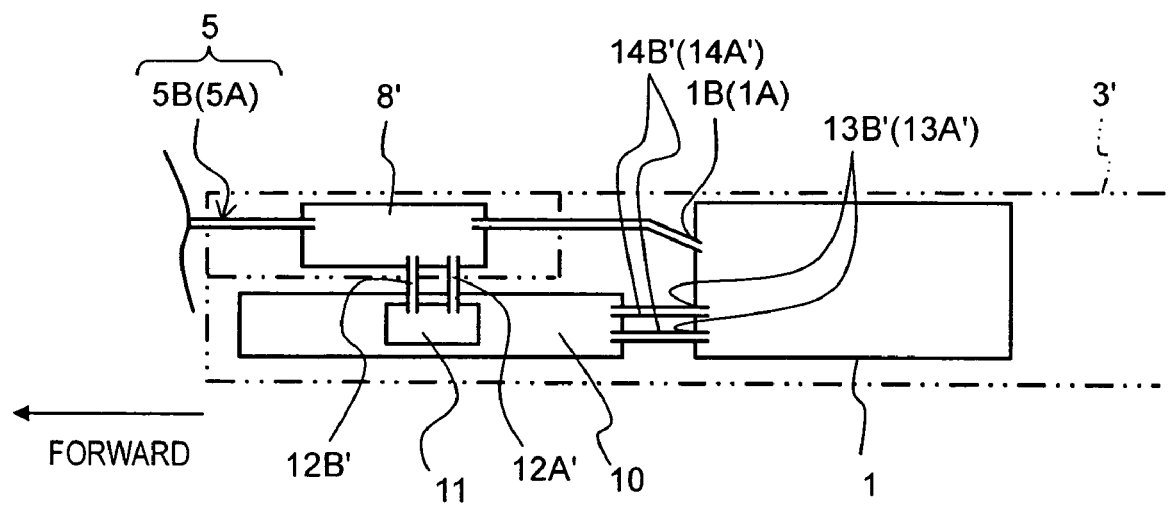
FIG. 11 is a diagrammatic side view of the fuel cell, a coolant pipe unit, a coolant supply module, and a fuel supply unit disposed in a space below a floor panel showing pipe connection relationships between the fuel cell, the coolant supply module, and the fuel supply unit in the fuel cell automobile in accordance with the sixth embodiment of the present invention.

Referring now to FIGS. 10 and 11, a fuel cell automobile in accordance with a sixth embodiment will now be explained. In view of the similarity between the fifth and sixth embodiments, the parts of the sixth embodiment that are identical to the parts of the fifth embodiment will be given the same reference numerals as the parts of the fifth embodiment. Moreover, the descriptions of the parts of the sixth embodiment that are identical to the parts of the fifth embodiment may be omitted for the sake of brevity. The parts of the sixth embodiment that differ from the parts of the fifth embodiment will be indicated with a single prime (') or a double prime (").

The fuel cell automobile of the sixth embodiment is basically identical to the fuel cell automobile of the fifth embodiment except for the positional arrangement of a reaction gas supply module 10' with respect to the fuel cell 1.

FIG. 10 is a diagrammatic frontal view showing height relationships between the coolant inlet and outlet 1A and 1B, a pair of reaction gas inlets 13A and a pair of reaction gas outlets 13B of the fuel cell 1 in the fuel cell automobile in accordance with the sixth embodiment of the present invention. FIG. 11 is a diagrammatic side view of the space under the floor panel 3' showing the pipe connection relationships between the fuel cell 1, the coolant supply module 8", and the reaction gas supply module 10' in the fuel cell automobile in accordance with the sixth embodiment of the present invention.

As shown in FIGS. 10 and 11, in the sixth embodiment, the coolant inlet 1A and the coolant outlet 1B provided on the fuel cell 1 are positioned higher than at least a pair of reaction gas inlets 13A' and a pair of reaction gas outlets 13B' that are provided for supplying the fuel (reaction gas) to the fuel cell 1. In the sixth embodiment, the coolant inlet 1A and the coolant outlet 1B are provided on an upper part of the fuel cell 1 and the reaction gas inlets and outlets 13A' and 13B' are provided below the coolant inlet and outlet 1A and 1B, respectively, as seen in FIG. 10. The reaction gas inlets and outlets 13A and 13B of the fuel cell 1 and a reaction gas supply module 10' are connected together by a pair of reaction gas supply pipes 14A' (only one reaction gas supply pipe 14A' is shown in FIG. 11) that is connected to the reaction gas inlets 13A' and a pair of reaction gas supply pipes 14B' (only one reaction gas supply pipe 14B' is shown in FIG. 11) that is connected to the reaction gas outlets 14B'. The reaction gas supply pipes 14A and 14B are arranged in lower positions than the coolant pipes 5A and 5B of the coolant pipe unit 5 as seen in FIG. 11.

With the sixth embodiment of the present invention, since the coolant inlet 1A and the coolant outlet 1B are arranged in relatively high positions, the part where moisture-containing air and hydrogen are discharged from the fuel cell 1 (i.e., the reaction gas outlets 13B') can be arranged at the same height position as the coolant inlet and outlet 1A and 1B or a lower height than the coolant inlet and outlet 1A and 1B. Therefore, the number of pipe crossings among the portions of the coolant pipes 5A and 5B connected between the fuel cell 1 and the coolant supply module 8', the coolant pipes 12A' and 12B' and the reaction gas supply pipes 14A' and 14B' can be reduced. As mentioned above, the coolant supply module 8' is arranged in the center tunnel portion 7 provided in the middle of the floor panel 3' relative to the transverse direction of the vehicle 2. The coolant pipes 12A' and 12B' connect between the coolant supply module 8' and the other fluid related parts, i.e., the reaction gas supply module 10 and the heat exchanger 11, which are arranged at the same height as or lower than the coolant supply module 8'. As a result, the layout can be simplified, the space can be used more efficiently, and pipe connection work can be accomplished more easily.

Additionally, by lowering the reaction gas outlets 13A' and inlets 13B' of the fuel cell 1, the sixth embodiment of the present invention simplifies the piping that carries moisture-containing exhaust gas from the fuel cell 1 to the other parts, better prevents the gas piping and parts from becoming clogged with water, and greatly improves the moisture collection performance and humidification performance.

Seventh Embodiment

Figure 12:
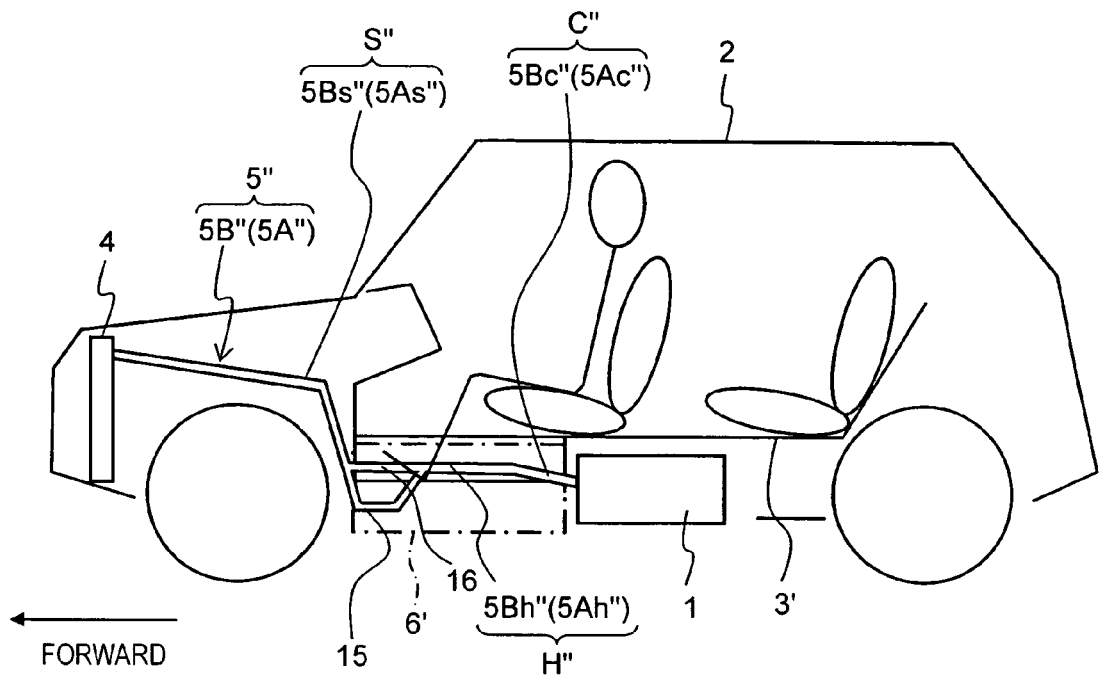
FIG. 12 is an overall diagrammatic side view of a fuel cell automobile illustrating height relationships between a fuel cell, a coolant pipe unit and a cooling system component part in a fuel cell automobile in accordance with a seventh embodiment of the present invention.
Figure 13:
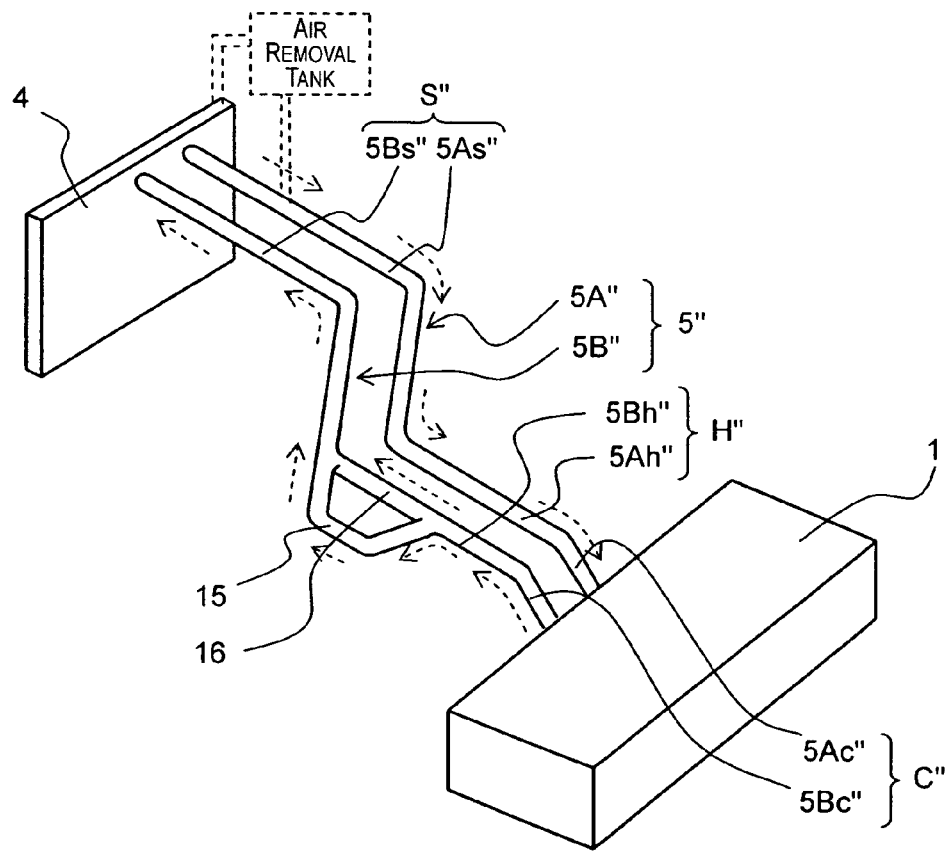
FIG. 13 is a simplified rear perspective view of the coolant pipe unit extending between the fuel cell and the cooling system component part in the fuel cell automobile illustrated in FIG. 12 in accordance with the seventh embodiment of the present invention.

Referring now to FIGS. 12 and 13, a fuel cell automobile in accordance with a seventh embodiment will now be explained. In view of the similarity between the second and seventh embodiments, the parts of the seventh embodiment that are identical to the parts of the second embodiment will be given the same reference numerals as the parts of the second embodiment. Moreover, the descriptions of the parts of the seventh embodiment that are identical to the parts of the second embodiment may be omitted for the sake of brevity. The parts of the seventh embodiment that differ from the parts of the second embodiment will be indicated with a single prime (') or a double prime (").

The fuel cell automobile of the seventh embodiment is basically identical to the fuel cell automobile of the second embodiment except that a part of a coolant pipe 5B" is diverged in two directions to form a downward sloping portion 15 and a air removal pipe portion 16 in a coolant pipe unit 5".

FIG. 12 is a diagrammatic side view of the fuel cell automobile showing the coolant pipe unit 5" connected between the fuel cell 1 and the radiator 4 in accordance with the seventh embodiment of the present invention. FIG. 13 is a simplified perspective view of the coolant pipe unit 5" extending between the fuel cell 1 and the radiator 4 in accordance with the seventh embodiment. FIG. 13 also shows an optional air removal tank that can be used in the cooling system for the fuel cell 1.

As shown in FIGS. 12 and 13, in the seventh embodiment of the present invention, the coolant pipe 5B" has the downward sloping portion 15 that slopes downwardly under the floor panel 3' and the air removal pipe portion 16 that is provided to branch from the coolant pipe 5B" at a position immediately before the downward sloping portion 15 with respect to the flow of coolant (shown in the dotted line arrows in FIG. 13). The air removal pipe portion 16 is arranged such that the air removal pipe portion 16 runs substantially horizontally toward the radiator 4. Of course, it will be apparent to those skilled in the art from this disclosure that it is also acceptable for the air removal pipe portion 16 to extend with an upward slope from the fuel cell 1 toward the radiator 4.

With the seventh embodiment of the present invention, the accumulation of air inside the coolant pipe 5B" that carries coolant from the fuel cell 1 to the radiator 4 can be reduced even if the downward sloping portion 15 exists along the path of the coolant pipe 5B" because an air removal pipe portion 16 is provided so as to branch from the coolant pipe 5B" at a position at or immediately before the downward sloping portion 15 with respect to the flow of the coolant. As a result, the cooling performance can be prevented from declining due to the downward sloping portion 15 and the temperature controllability can be improved.

Although specific embodiments employing the present invention are described herein, the invention is not limited to the embodiments and various modifications and variations are possible.

For example, although the first through seventh embodiments explained above are related to the coolant pipe unit 5, 5' or 5'" that is connected between the fuel cell 1 and the radiator 4 (the cooling system component part), it is also possible to apply the same constituent features of the coolant pipe unit 5, 5' or 5'" to coolant pipes connected between the fuel cell 1 and an air removal tank or a coolant reservoir tank as seen in FIGS. 2 and 13. In such case, the air removal tank or the coolant reservoir tank constitutes a coolant system component part of the present invention.

More specifically, when a main circulation system that includes the radiator 4 is provided with an air removal tank and/or a reservoir tank connected in series through an air removal pipe, air bubbles in the main line and air anywhere else in the coolant circuit will collect in the tank(s). As a result, air bubbles, which can cause both the cooling performance and the temperature controllability to decline, can be eliminated from the coolant pipes 5A and 5B connected between the fuel cell 1 and the radiator 4.

Accordingly, with the fuel cell automobile in accordance with the present invention, a sufficient space is provided in the vehicle interior, the effectiveness with which air is removed from the coolant is improved, and the space occupied by piping and parts related to the fuel cell 1 in the fuel cell automobile is reduced. The invention achieves these objects by improving the arrangement of the coolant piping (i.e., the coolant pipe unit 5, 5' and 5") and cooling system component part (i.e., the radiator 4, an air removal tank and/or a coolant reservoir tank) that is configured to cool the fuel cell 1, improving the arrangement of piping and parts related to hydrogen, oxygen, and other fluids, and improving the positioning of the fluid inlets and outlets (i.e., 13A or 13A' and 14A or 14A') of the fuel cell 1 so that the coolant pipe unit 5 and parts (for both the coolant and other fluids) can be arranged more efficiently in a limited space under the floor panel (i.e., 3 or 3') of the vehicle 2.

As used herein to describe the above embodiment(s), the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A fuel cell automobile comprising:
   a fuel cell disposed under a floor panel of a vehicle;
   a cooling system configured and arranged to regulate temperature of the fuel cell using a coolant, the cooling system including at least one cooling system component part that is disposed in a front portion of the vehicle;
   a coolant pipe unit extending between the fuel cell and the cooling system component part, the coolant pipe unit having a generally horizontal portion disposed in a space under a first part of the floor panel and a slope portion extending and sloping continuously upwardly from the horizontal portion to the cooling system component part above the first part of the floor panel, at least a part of the horizontal portion being disposed above at least a second part of the floor panel with the second part of the floor panel being laterally offset from the horizontal portion.

2. The fuel cell automobile recited in claim 1, wherein the horizontal portion of the coolant pipe unit is disposed at an approximate transverse center portion of the vehicle.

3. The fuel cell automobile recited in claim 2, wherein the cooling system component part includes at least one of a radiator and an air removal tank.

4. The fuel cell automobile recited in claim 1, wherein the fuel cell includes a coolant inlet and a coolant outlet arranged on an upper, approximate center portion of a frontward side of the fuel cell with vertical positions of the coolant inlet and the coolant outlet being substantially level with a vertical position of the horizontal portion of the coolant pipe unit.

5. The fuel cell automobile recited in claim 1, wherein the fuel cell includes a coolant inlet and a coolant outlet and at least a fuel inlet and a fuel outlet with the coolant inlet and the coolant outlet being disposed in vertical positions that are higher than vertical positions of the fuel inlet and the fuel outlet.

6. The fuel cell automobile recited in any one of claim 1, wherein
   the coolant pipe unit further includes a downward sloping portion that slopes downwardly from the horizontal portion of the coolant pipe unit and an air removal pipe portion that branches from the horizontal portion of the coolant pipe unit immediately before the downward sloping portion with respect to a flow of the coolant, the air removal pipe portion extending substantially horizontally or slope upwardly toward the cooling system component part to merge with the slope portion of the coolant pipe unit.

7. A fuel cell automobile comprising:
   a fuel cell disposed under a floor panel of a vehicle;
   a cooling system configured and arranged to regulate temperature of the fuel cell using a coolant, the cooling system including at least one cooling system component part that is disposed in a front portion of the vehicle;
   a coolant pipe unit extending between the fuel cell and the cooling system component part, the coolant pipe unit having a generally horizontal portion disposed in a space under the floor panel and a slope portion extending and sloping continuously upwardly from the horizontal portion to the cooling system component part above the floor panel,
   the horizontal portion of the coolant pipe unit being disposed in a bulged portion of the floor panel that extends longitudinally and that bulges upwardly toward an interior of the vehicle.

8. The fuel cell automobile recited in claim 7, wherein the bulged portion of the floor panel is arranged as a center tunnel of the floor panel.

9. The fuel cell automobile recited in claim 8, further comprising
   a coolant supply module disposed in the center tunnel of the floor panel and coupled to the horizontal portion of the coolant pipe unit for supplying the coolant.

10. The fuel cell automobile recited in claim 9, further comprising a fuel supply unit configured and arranged to supply fuel to the fuel cell, and including at least a reaction gas supply module coupled to the fuel cell, the fuel supply unit being disposed in the space under the floor panel at a vertical position that is level or lower than a vertical position of the coolant supply module.

11. The fuel cell automobile recited in claim 10, wherein the fuel supply unit includes a heat exchanger that is coupled to the coolant supply module so that the coolant is circulated in the heat exchanger.

12. The fuel cell automobile recited in claim 7, wherein the fuel cell includes a coolant inlet and a coolant outlet arranged on an upper, approximate center portion of a frontward side of the fuel cell with vertical positions of the coolant inlet and the coolant outlet being substantially level with a vertical position of the horizontal portion of the coolant pipe unit.

13. The fuel cell automobile recited in claim 7, wherein the fuel cell includes a coolant inlet and a coolant outlet arranged on an upper, approximate center portion of a frontward side of the fuel cell with vertical positions of the coolant inlet and the coolant outlet being lower than a vertical position of the horizontal portion of the coolant pipe unit.

14. The fuel cell automobile recited in claim 13, further comprising
a coolant supply module disposed in the bulged portion of the floor panel and coupled to the horizontal portion of the coolant pipe unit to supply the coolant.

15. The fuel cell automobile recited in claim 14, further comprising
a fuel supply unit configured and arranged to supply fuel to the fuel cell, and including at least a reaction gas supply module coupled to the fuel cell, the fuel supply unit being disposed in the space under the floor panel at a vertical position that is level or lower than a vertical position of the coolant supply module.

16. The fuel cell automobile recited in claim 15, wherein the fuel cell includes a coolant inlet and a coolant outlet and at least a fuel inlet and a fuel outlet with the coolant inlet and the coolant outlet being disposed in vertical positions that are higher than vertical positions of the fuel inlet and the fuel outlet.

17. A fuel cell automobile comprising:
a fuel cell disposed under a floor panel of a vehicle;
a cooling system configured and arranged to regulate temperature of the fuel cell using a coolant, the cooling system including at least one cooling system component part that is disposed in a front portion of the vehicle;
a coolant pipe unit extending between the fuel cell and the cooling system component part, the coolant pipe unit having a generally horizontal portion disposed in a space under the floor panel and a slope portion extending and sloping continuously upwardly from the horizontal portion to the cooling system component part above the floor panel,
the fuel cell including a coolant inlet and a coolant outlet arranged on an upper, approximate center portion of a frontward side of the fuel cell with vertical positions of the coolant inlet and the coolant outlet being lower than a vertical position of the horizontal portion of the coolant pipe unit.

18. A fuel cell automobile comprising:
energy generating means, disposed under a floor panel of a vehicle, for converting chemical energy of a fuel and oxidant into electrical energy;
cooling means, disposed in a front portion of the vehicle, for cooling the energy generating means by a coolant; and
coolant circulating means for circulating the coolant between the energy generating means and the cooling means, the coolant circulating means being configured and arranged such that the coolant flows substantially horizontally in an horizontally arranged portion of the coolant circulating means under an approximate center portion of the floor panel and in an upwardly slanted manner in a direction from the energy generating means toward the cooling means above the floor panel, at least a part of the horizontally arranged portion being disposed above at least a part of the floor panel that is laterally offset from the horizontally arranged portion.

* * * * *